United States Patent

Rousseau

Patent Number: 5,284,685
Date of Patent: Feb. 8, 1994

[54] COMPOSITE MATERIAL WITH CARBON REINFORCED FIBERS AND ITS PRODUCTION

[75] Inventor: Gérard Rousseau, Saint Aubin de Medoc, France

[73] Assignee: Aerospatiale Societe Nationale Industrielle, France

[21] Appl. No.: 911,248

[22] Filed: Jul. 7, 1992

Related U.S. Application Data

[60] Continuation of Ser. No. 711,286, Jun. 1, 1991, abandoned, which is a division of Ser. No. 394,020, Aug. 15, 1989, Pat No. 5,051,300.

[30] Foreign Application Priority Data

Aug. 31, 1988 [FR] France ................. 88 11401

[51] Int. Cl.$^5$ ........................... C23C 16/00
[52] U.S. Cl. ......................... 427/574; 427/577; 427/578; 427/249; 427/419.7
[58] Field of Search ............ 427/112, 113, 204, 249, 427/419.7, 574, 577, 578

[56] References Cited

U.S. PATENT DOCUMENTS

| | | |
|---|---|---|
| 3,095,316 | 6/1963 | Hartwig. |
| 3,406,044 | 10/1968 | Harris ................. 117/215 |
| 3,925,577 | 12/1975 | Fatzer et al. .......... 427/249 |
| 4,397,901 | 8/1983 | Warren ............... 427/419.7 |
| 4,425,407 | 1/1984 | Galasso et al. ........ 428/368 |
| 4,476,164 | 10/1984 | Veltri et al. ........... 427/249 |
| 4,476,178 | 10/1984 | Veltri et al. ........... 428/215 |
| 4,565,777 | 1/1986 | Ogawa et al. .......... 430/552 |
| 4,844,951 | 7/1989 | Sarin et al. ........... 427/419.7 |
| 4,863,798 | 8/1989 | Arenz et al. .......... 427/248.1 |
| 4,976,899 | 12/1990 | Rousseau et al. ...... 427/419.7 |
| 5,045,356 | 9/1991 | Uemuro et al. ........ 427/113 |

FOREIGN PATENT DOCUMENTS 0133315 1/1983 European Pat. Off. .

OTHER PUBLICATIONS

"Methodes et techniques", *L'actualite chimique*, Sep. 1978, pp. 25-33 par S. Audisio.
"Weight Uncertainty Analysis For Space Shuttle Reinforced Carbon-Carbon", by J. H. Henson and R. N. Staton, *Sawe Paper* 1265, Index Category No. 21.

*Primary Examiner*—Shrive Beck
*Assistant Examiner*—Benjamin L. Utech
*Attorney, Agent, or Firm*—Pearne, Gordon McCoy & Granger

[57] ABSTRACT

A process for making a composite material wherein carbon reinforcing fibers may be coated with a carbon coating and a silicon carbide coating. The fibers are then densified in a carbon-based matrix, covered by a first silicon carbide layer, optionally sealed by a second silicon carbide coating, then an aluminum nitride or hafnium nitride coating and finally an outer alumina coating are applied. This stainless material can be used as a heat shield for space shuttles.

15 Claims, 2 Drawing Sheets

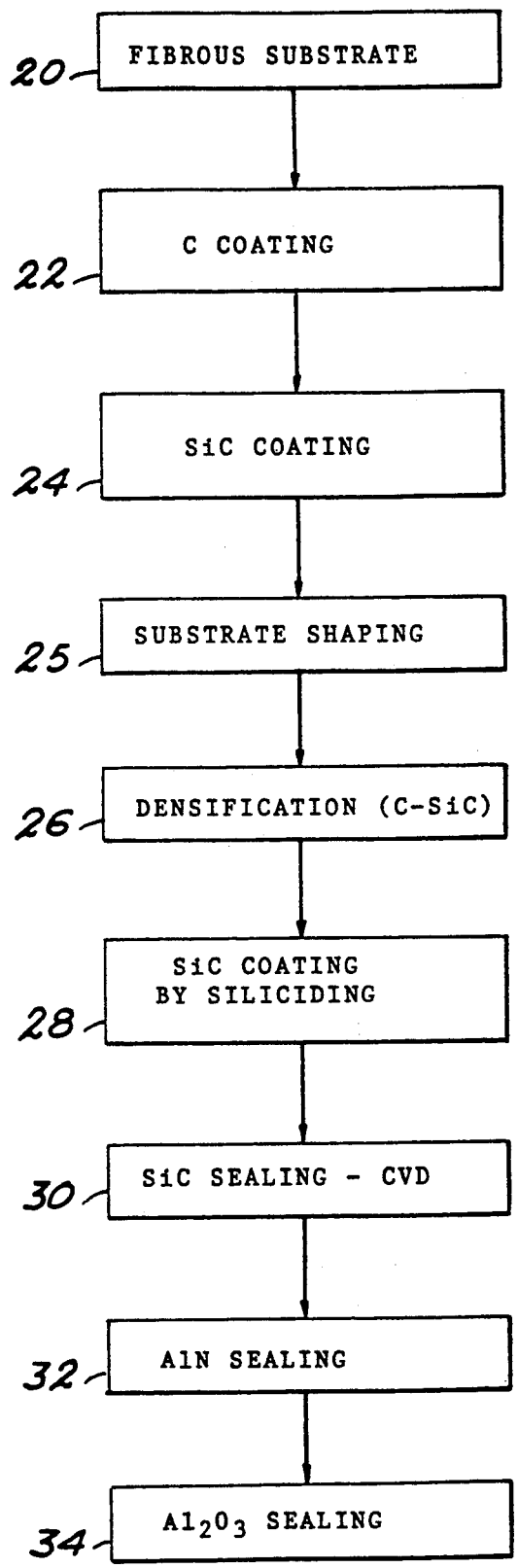

COMPOSITE MATERIAL WITH CARBON REINFORCED FIBERS AND ITS PRODUCTION

This is a continuation of application Ser. No. 07/711,286, filed Jun. 6, 1991, now abandoned, which is a divisional application Ser. No. 07/394,020, filed Aug. 15, 1989, now U.S. Pat. No. 5,051,300.

BACKGROUND OF THE INVENTION

The present invention relates to a composite material of the carbon-carbon type made stainless up to a temperature of 1800° C., under a low air pressure, as well as to its production process.

This composite material is more particularly intended for use as a high performance heat protection for space vehicles (shuttles or aircraft) having to resist heating caused by the friction of the air when they reenter the atmosphere at high speed.

However, the invention is also applicable to other industrial fields requiring the use of structures able to resist high mechanical stresses under temperature above 1100° C. in a corrosive medium. This is particularly the case with improved efficiency turbine engines operating at high temperatures (between 1300° and 1400° C.) and certain industrial heat recuperators.

The major problem of carbon-carbon type composite materials is their oxidation in air at high temperature causing the carbon to be converted into CO or $CO_2$, so that the composite material is deteriorated and even destroyed. To prevent said oxidation, different processes have already been considered with regards to the protection of the carbon-containing materials and based on the use of a silicon carbide (SiC) coating formed on the outer surface of the composite material parts.

This outer SiC coating can be obtained by conversion into a silicide or siliciding the carbon of the outer portion of the material. Siliciding is carried out by pack cementation, as described in U.S. Pat. No. 3,095,316, or by chemical vapor phase deposition (CVD/CVPD). The deposition of SiC by CVD can be carried out by depositing a silicon coating on the outer portion of the material and then melting the silicon in order to ensure its diffusion into the material and its reaction with the carbon of the latter to form the SiC, as described in U.S. Pat. Nos. 3,406,044 and 3,925,577.

This outer SiC coating can also be obtained directly by SiC deposition based on the cracking of chlorosilane vapors, either alone or combined with hydrogen or hydrocarbons, as described by the article by S. Audisto in Actualié Chimique, September 1978, pp 25-33.

Other methods combine the siliciding of the surface carbon of the composite material with a chemical vapor phase deposition (cf. U.S. Pat. Nos. 3,406,044, 4,425,907 and 4,476,178.

All the aforementioned methods for producing a SiC coating on carbon-carbon type composite materials lead to the obtaining of a cracked coating as a result of the variation in the expansion coefficients between the carbon and the silicon carbide. Moreover, in order to obviate this disadvantage, with the outer SiC coating has been combined a silica coating for sealing the cracks of the SiC coating (cf. "Weight uncertainty analysis for space shuttle reinforced carbon-carbon" SAWE Paper 1265-37th Annula Conference May 8-10, 1978).

In order to improve the sealing of the cracks of the SiC coating, consideration has also been given to the user of a coating based on SiC powder and a sodium silicate-based glass, to which may optionally be added sodium borate, or based on aluminium phosphate and alumina powder, as described in U.S. Pat. Nos. 4,500,602 and 4,565,777. The object of these glasses is to lower the temperature from 1200° to 1300° C. to 800° C. as from which the sealing of the cracks of the SiC coating becomes effective.

The same type of result is obtained by adding boron during the formation of the SiC coating by pack cementation (cf. U.S. Pat. No. 4,476,164). The glass which forms naturally on the SiC heated in air, e.g. during the reentry of space vehicles into the atmosphere, is a borosilicate with a lower melting point than silicon dioxide.

Finally, the sealing of the outer SiC coating by silicon dioxide and then by a glass based on silicate and borate is in particular described in EP-A-133 315.

Therefore all the above protections are based on the use of an outer SiC coating completed by silica glasses associated with $B_2O_3$, $Na_2O$ and $P_2O_5$.

These protections operate correctly up to temperatures of approximately 1700° C. at atmospheric pressure. However, under reduced pressure, the operating temperature of these materials is limited by the reaction of the silica ($SiO_2$) on the silicon carbide corresponding to the following equation:

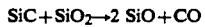

$$SiC + SiO_2 \rightarrow 2\ SiO + CO$$

Thus, the vapors of silicon monoxide and carbon monoxide produced perforate the viscous silica coating when the pressure produced exceeds that of the external atmosphere, namely:
2.9 KPa at 1500° C.
10 KPa at 1600° C.
32.6 KPa at 1700° C.
92.0 KPa at 1800° C.

These conditions are those of silica alone.

SUMMARY OF THE INVENTION

The invention relates to a composite material with carbon reinforcing fibers coated with an outer silicon carbide layer sealed by a material able to withstand higher temperatures under reduced pressures, such as 1800° C. under 2.8 KPa or 2000° C. under 20 KPa.

In particular, the material according to the invention can be used for equipping certain more stressed areas of space vehicles such as the nose, the ailerons and the leading edges, whereas the other parts of such vehicles can be constructed in accordance with the prior art.

More specifically, the invention relates to a composite material having a substrate of carbon fibers embedded in a matrix, an outer silicon carbide layer and a covering of said outer layer, characterized in that the covering comprises an outermost coating of an oxide chosen from among $ThO_2$, $ZrO_2$, $HfO_2$, $La_2O_3$, $Y_2U_3$ and $Al_2O_3$ and an intermediate coating of a compound not containing silicon serving as a reaction barrier between the silicon carbide and the oxide.

The object of the oxide is to prevent, under high temperature and reduced pressure, the passage of oxygen as a result of its good sealing and high refractory characteristics.

Preferably, use is made of alumina due to the fact that it has a better diffusion coefficient than oxygen. The diffusion coefficient of oxygen in alumina at 1200° C. is $3.10^{-16}$ cm$^2$/s, i.e. 100 times lower than that of silica which is $3.10^{-14}$ cm$^2$/s.

Any material which is not very reactive with silicon carbide and the aforementioned oxides and which has a good adhesion to the latter can be used as the intermediate layer. To this end, reference is made to carbides, nitrides, borides and even certain noble metals (Ir). Preference is given to the use of nitrides, carbides and borides such as HfC, TaC, ZrC, W$_2$C, NbC, ThC$_2$, ZrB$_2$, HfB$_2$, TiB$_2$, BN, HfN, ZrN, AlN; as well as certain noble metals of the platinum type such as Pt, Ir, Os, Rh and Ru.

The invention also relates to a composite material having a substrate of carbon fibers embedded in a matrix, a silicon carbide layer and a covering of the layer, characterized in that the covering comprises this oxide coating and an intermediate coating not containing silicon serving as a reaction barrier between the silicon carbide and the oxide, said intermediate coating being chosen from among HfC, TaC, ZrC, W$_2$C, NbC, ThC$_2$, ZrB$_2$, HfB$_2$, TiB$_2$, BN, HfN, ZrN, AlN, Pt, Ir, Os, Rh and Ru.

The term "compound" not containing silicon is understood to mean a compound which does not intentionally contain silicon. In particular, the barrier layer is not silicon or a nitride, of silicon or a carbide, of silicon or a boride of silicon. In addition, the oxide coating is not of SiO or SiO$_2$.

The use of an outer alumina coating and an intermediate coating according to the invention permits a gain of 300° C. at comparable pressure compared with a prior art system with silica glass only. Thus, these systems make it possible to lower the total pressure of the gases at the interface with Al$_2$O$_3$. For example, these compounds have pressure values at 1800° C. as indicated below:

| Interface | Pressure at 1800° C. |
| --- | --- |
| ZrC | 2.25 KPa |
| ZrB$_2$ | 0.11 KPa |
| HfC | 2 KPa |
| HfN | 2 KPa |
| TaC | 1.2 KPa |
| W$_2$C | 0.29 KPa |
| TiB$_2$ | 0.06 KPa |
| BN | 1 KPa |
| AlN | 2.7 KPa |

More particularly with AlN-Al$_2$O$_3$, at different temperatures, the following pressure values are obtained:
less than 0.1 KPa at 1500° C.,
0.72 KPa at 1700° C.,
2.8 KPa at 1800° C.,
9 KPa at 1900° C.,
20 KPa at 2000° C.

The use of an intermediate hafnium nitride coating is slightly more favorable than an aluminum nitride coating. Thus, at 1800° C. the pressure is 2 KPa. However, the expansion coefficient of hafnium nitride is slightly less favorable than that of AlN, namely 6.2.10$^{-6}$/°C. in place of 4.10$^{-6}$/°C.

The silicon carbide layer formed at high temperature and with a thickness of at the most 600 micrometers and which covers all the outer surfaces of the composite material ensures the sealing of the latter with respect to the penetration of oxidizing gases and in particular oxygen. As this layer is cracked, effective sealing of the cracks of the said outer layer can take place with silicon carbide at low temperature between the barrier layer and the outer SiC layer.

The composite material matrix can be of vitreous carbon or graphite, optionally doped with finely divided silicon carbide. In the latter case, the matrix contains at the most 20% by weight silicon carbide and preferably 2 to 10% by weight thereof. This low SiC proportion in the matrix, whilst still ensuring an effective anti-oxidation protection, in no way modifies the physical properties of said carbon matrix.

The invention also relates to a process for the production of a composite material as defined hereinbefore. Thus, according to a main feature, said process comprises the following stages:
(a) formation of a deformable porous substrate constituted by carbon fibers,
(b) shaping the substrate,
(c) densification of the shaped substrate for forming the matrix,
(d) covering the outer surface of the matrix by an outer silicon carbide layer,
(e) deposition of an intermediate coating not containing silicon serving as a reaction barrier between the silicon carbide and an oxide,
(f) covering the intermediate layer by an external coating of an oxide chosen from among ThO$_2$, ZrO$_2$, HfO$_2$, La$_2$O$_3$, Y$_2$O$_3$ and Al$_2$O$_3$.

The invention also relates to a process for the production of a composite material having a substrate of carbon fibers embedded in a matrix, characterized in that it comprises the following stages:
(a) formation of a deformable porous substrate constituted by carbon fibers,
(b) shaping the substrate,
(c) densification of the shaped substrate for forming the matrix,
(d) covering the outer surface of the matrix by an outer silicon carbide layer,
(e) deposition of an intermediate coating serving as a reaction barrier between the silicon carbide and an oxide, said intermediate coating being chosen from among HfC, TaC, ZrC, W$_2$C, NbC, ThC$_2$, ZrB$_2$, HfB$_2$, BN, HfN, ZrN, AlN, Pt, Ir, Os, Rh and Ru.
(f) covering the outer layer by an oxide coating not containing silicon.

The fibrous substrate of the composite material can be formed by graphite or carbon fibers obtained from any random precursor and in particular from polyacrylonitrile (PAN), pitch or rayon. Moreover, as a function of the sought final properties for the composite material, said fibers can be short or long, with a high strength or high modulus and may have undergone graphitization treatments. The fibrous substrate is obtained by weaving or filamentary winding of carbon fibers in one, two, three or N directions.

According to a preferred embodiment of the inventive process, the outer silicon carbide layer is formed by siliciding the outer surface of the densified structure. This siliciding makes it possible to form a SiC coating which adheres perfectly to the matrix. In particular, siliciding is performed by pack cementation, i.e. the material to be silicided is immersed in a mixture of powders which, by heating, gives off vapors of the siliciding species, which are silicon and/or silicon monoxide.

The proper mixtures usable for supplying silicon and SiO are constituted by silicon carbide and at least one random oxide able to react with the silicon carbide to form silicon monoxide. The oxide used is in particular silica or alumina.

With a SiC+SiO₂ mixture at about 1650° C. SiO is formed and at about 1800° C. a mixture of SiO vapors and silicon. Optionally, it is possible to add to said mixture a silicon carbide excess in order to dilute the reactive elements and therefore prevent the silica from agglomerating the mixture during melting. The silica level can be such that it is entirely consumed.

With a SiC+Si+Al₂O₃ mixture, vapors of silicon and SiO are obtained with a definite preponderance of silicon vapors. This mixture generally contains 8 to 10% by weight alumina, 25 to 35% by weight silicon and 55 to 60% by weight silicon carbide.

The choice of the powder mixture is a function of the nature of the composite material used. With only slightly dense materials constituted by slightly graphitized fibers and a vitreous matrix (or slightly graphitized matrix), the preferred mixture is SiC+Si+Al₂O₃, which in principle contains 50 to 75% by weight SiC and 50 to 25% by weight SiO₂.

This difference is linked with the siliciding reactions implied with each of the siliciding vapors. With silicon, there is Si+C→SiC and with silicon monoxide SiO+2 C→+CO. These equations indicate that the volume variation is half as large with silicon as with SiO.

For example, a composite material of density 1.4 has an expansion or swelling of 1.45 with silicon and 0.73 with SiO. In the latter case, the layer would be porous and a mixture of silicon vapors and SiO vapors is preferably used.

Surface siliciding of the composite material is carried out in the presence of a neutral gas such as helium, argon, etc.

The duration of the immersion of the densified structure in the powder mixture at the chosen temperature makes it possible to fix the thickness of the SiC coating, the latter having a thickness between 200 and 600 μm.

Siliciding makes it possible to form a 200 to 600 μm thick SiC surface layer, as well as an underlying carbon/silicon carbide composite layer of 40 to 200 μm, resulting from the preferred siliciding of the carbon of the matrix, the carbon of the fibers only being partly silicided. This underlying layer ensures a good adhesion of the outer SiC layer to the carbon of the matrix, thus preventing any separation from the outer layer.

As a result of a difference between the expansion coefficients of the carbon of the matrix and the SiC of the outer layer, the latter is cracked.

It is also possible to consider a sealing of these cracks with silicon carbide directly deposited by chemical vapor phase deposition and therefore at temperatures lower than for siliciding (i.e. 600° to 1000° C.), thus improving the sealing of the protection at low temperature. Plasma-assisted CVD deposition permits sealing at about 600° C.

These chemical vapor phase deposits takes place by the cracking of one or more organosilanes substituted or not by a halogen with which is optionally associated one or more gaseous hydrocarbons and/or hydrogen.

The organosilanes which are usable are in particular chlorosilanes of the form $(CH_3)_nSiCl_{(4-n)}$ with $0 \leq n \leq 4$. Reference is e.g. made to trichloromethyl silane, tetramethyl silane and dichlorodimethyl silane. The hydrocarbons which can be used are in particular methane, ethane, propane and butane. Preference is given to the use of the gaseous mixture containing trichloromethyl silane and hydrogen in a ratio of $[H_2]:[CH_3SiCl_3]$ 4:12.

However, other mixtures can be used, such as trichloromethyl silane in the presence of butane and hydrogen in the ratios: $[H_2]:[CH_3SiCl_3]$ 1:8 and $[C_4H_{10}]:[CH_3SiCl_3]$ 1:5, or trichloromethyl silane alone.

Temperatures of 600° to 1000° C. and pressures of 0.5 to 10 KPa are fixed so as to permit a good diffusion of the gases and a deposition at the bottom of the cracks.

The thickness of the SiC deposited by CVD varies from 2 to 10 μm. This thickness is sufficient for closing the cracks of the outer SiC layer and porosities of the carbon at the bottom of the crack, which makes the protection tight even at low temperature (as from 600° C.).

According to the invention, it is possible to deposit the outer SiC layer by CVD from the above gaseous mixtures, at pressures and temperatures higher than those used for sealing by SiC (typically 1100° C. and 10 KPa).

According to the invention, it is possible to use all known methods for depositing a barrier layer between the outer SiC layer and the oxide, such as alumina. In the particular case of aluminum nitride, the nitride coating can easily be deposited by CVD at about 950° C. and therefore under conditions identical to those of the SiC used for sealing. Moreover, this material has an expansion coefficient close to that of SiC. In addition, AlN deposition is preferably carried out by CVD. Chemical vapor phase deposition of aluminium nitride takes place under a reduced pressure between 0.5 and 10 KPa and with scavenging of a neutral gas such as helium or argon.

Other aluminum nitride deposition methods, such as the nitriding of an alumina layer, or physical vapor phase deposition (PVD) are also usable. Thus, PVD methods, such as reactive cathodic sputtering, reactive evaporation and aluminum nitride spraying makes it possible to obtain thin aluminum nitride films. However, these methods suffer from the disadvantage of supplying coatings at low temperatures (close to ambient temperature), which are therefore highly compressed during their use at high temperature.

No matter what the method used for aluminum nitride deposition, the latter has a thickness of 0.5 to 5 μm.

For the same reasons as given hereinbefore for aluminum nitride, it is possible to deposit a hafnium coating, in place of AlN, by CVD or PVD.

According to the invention, the outer alumina layer is deposited in alpha form by CVD and in particular by gaseous phase hydrolysis of the aluminum chloride. The hydrolysis water is formed in situ in the reactor by the reaction of carbon dioxide gas on hydrogen. The following reactions are involved:

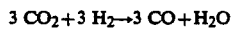

$$3\ CO_2 + 3\ H_2 \rightarrow 3\ CO + H_2O$$

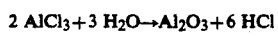

$$2\ AlCl_3 + 3\ H_2O \rightarrow Al_2O_3 + 6\ HCl$$

The reaction is essentially governed by the production of the water responsible for the hydrolysis of the aluminum chloride. Deposition takes place with a partial hydrogen to carbon dioxide gas ratio close to 1.

The temperature and the partial pressure of the aluminium chloride are chosen as low as possible, so as to favor in a kinetics of the deposit, the diffusion of the reactive species compared with the surface alumina formation kinetics. Therefore, the deposition rate is controlled solely by the chemical reaction speed on the surface of the material.

These conditions make it possible to obtain a very uniform alumina layer, which adheres well, due to its capacity of perfectly adapting to all the surface irregularities of the underlying material. The values of the parameters best fulfilling these conditions are total pressure 4 KPa, aluminum chloride pressure 0.1 KPa and temperature 1000° C.

During cooling, cracks existing in the outer SiC layer form again and are then closed again during the use of the composite material as soon as the temperature reaches 1000° C. The alumina thickness deposited varies from 2 to 100 μm, as a function of the use conditions provided for the composite material.

According to the invention, the densification of the porous substrate can be carried out by pyrolysis of thermosetting resin with a high carbon content or gaseous hydrocarbon cracking with a view to obtaining a carbon matrix, or by slightly modifying these known processes with a view to obtaining a SiC-doped carbon matrix.

To this end, the silicon carbide supplied to the matrix, in the case of densification by pyrolysis of a thermosetting resin, is obtained by grafting onto the molecules of the polymer functional groups having Si-O bonds, the latter supplying during the thermal pyrolysis treatments the silicon carbide divided to the molecule scale. Advantageously, use is made of a carbon-containing polymer having 6 to 25% by weight (measured in $SiO_2$) and in particular 10% of functions of the silicon type (Si-O bonds).

Examples of pyrolyzable polymers are phenolic resins of the resol type and furan resins on which the silicone functions have been grafted by chemical reaction.

The densification by modified thermosetting resin involves several cycles each consisting of the impregnation by the resin, polymerization followed by a thermal stabilization treatment of the resin, pyrolysis with a view to transforming the resin into hard coke and then a high temperature heat treatment to transform the Si-O groups into silicon carbide.

It is also possible to form the composite C/SiC matrix by CVD involving the high temperature cracking of a mixture formed by at least one hydrocarbon and at least one organosilane, which may or may not be substituted by at least one halogen. The hydrocarbons and organosilanes which can be used are those referred to hereinbefore. The organosilane percentage varies between 1 and 8% by weight. It is dependent on the respective reactivity of the gases or vapors and/or temperatures (980° to 1100° C.), as well as the pressures (0.5 to 50 KPa) used.

Advantageously, each fiber of the substrate is coated with a thin silicon carbide film with a thickness of 100 to 200 nm, in order to retain the deformability of the substrate for its shaping. Thus, the shaping is generally performed following SiC deposition on the fibers, although it can take place before the SiC is deposited on the fibers. This SiC coating on the fibres is deposited by CVD using gaseous mixtures and conditions given for the SiC sealing of the outer layer.

The use of silicon carbide on the surface of the substrate fibers and in the matrix gives an anti-oxidation protection, whilst greatly slowing down the core oxidation of the composite carbon-carbon material in the case of accidental destruction or flaking of the outer SiC layer. Thus, the characteristics and effectiveness of the composite material are ensured, at least up to the end of the mission in question. Thus, under certain particularly difficult conditions, the outer SiC layer could be broken, e.g. under the effect of an impact, a vibration or friction occurring, in the particular case of the space field, during a flight of the vehicle.

The slowing down of the penetration of oxygen into the matrix, in the case of an accidental oxygen penetration, is particularly due to the preferred high temperature oxidation (above 1600° C.) of the silicon carbide compared with the carbon. This oxidation of the SiC leads to silicon dioxide, which involves an increase in the volume of the matrix in proportion to the SiC level therein. This volume increase associated with the melting of the silica (above 1300° C.) closes the cracks and pores in the carbon matrix which may be present, thus greatly slowing down the penetration of the oxygen to the core of the composite material and therefore its oxidation.

The preferred oxidation of the SiC of the matrix only takes place if it is in very highly divided form (the size of the grains must be of the same order of magnitude as the thickness of the $SiO_2$ coating covering each grain, i.e. <50 nm).

According to the invention, the surface of each carbon fibers can be provided with a pyrolytic carbon coating in contact with the thin SiC film covering the said fibers. This pyrolytic carbon coating can be deposited prior to the SiC film covering the fibers, or following the deposition thereof. This pyrolytic carbon coating constitutes an interface for preserving, or even improving the mechanical properties of the composite material.

BRIEF DESCRIPTION OF THE DRAWINGS

Other features and advantages of the invention can be gathered from the following illustrative and non-limitative description with reference to the drawings, wherein show:

FIG. 2 A diagram illustrating the different stages of the process for producing the material according to the invention.

DESCRIPTION OF THE PREFERRED EMBODIMENTS

Figure 1:
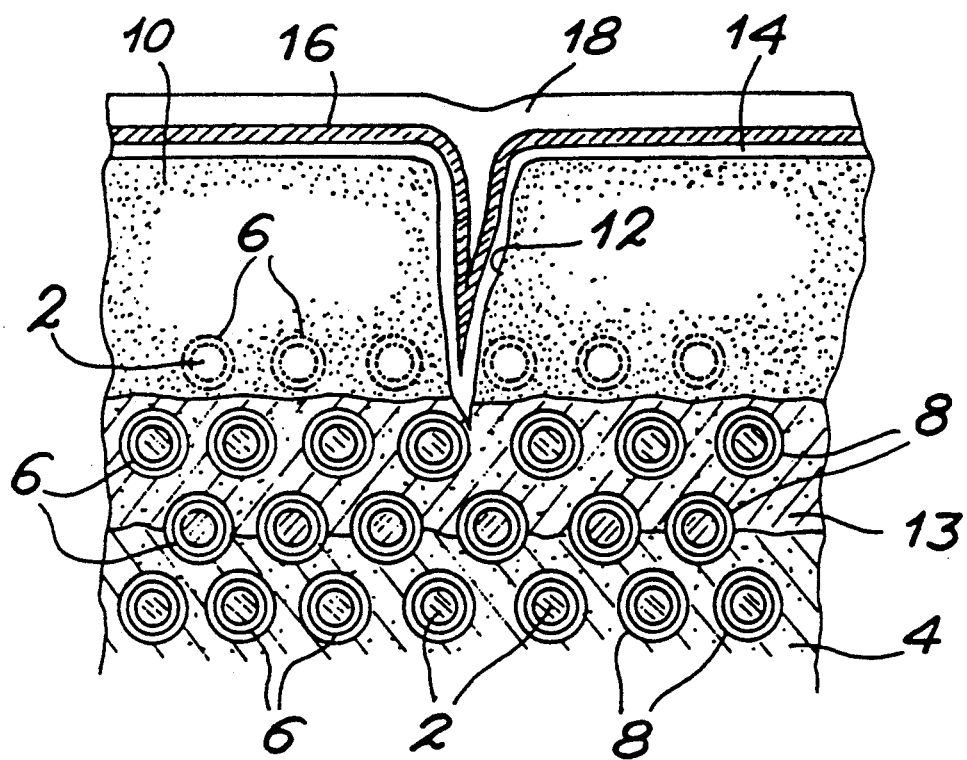
FIG. 1 Diagrammatically and in cross-section, a composite material according to the invention.

FIG. 1 shows a composite carbon-carbon material having carbon reinforcing fibers 2 embedded in a pyrolytic carbon matrix 4 containing at the most 20% and e.g. 2 to 10% by weight of silicon carbide greatly reducing the oxidizability of the carbon matrix. The fibers 2 are woven in three orthogonal dimensions and have an approximate thickness of 8 μm.

Each fibre 2 is coated with an extremely thin anisotropic pyrolytic carbon film with a thickness of at the most equal to 100 nm and preferably between 50 and 100 nm. Moreover, a silicon carbide coating 8 with a thickness of approximately 100 to 200 nm protects each fibers 2 against any oxidation by slowing down oxygen diffusion. This silicon carbide coating can be placed in direct contact with the fibers 2, or can cover the pyrolytic carbon coating 6.

The composite material according to the invention is covered with an outer silicon carbide layer 10 with a thickness of 200 to 600 μm. When the said outer layer 10 is obtained by siliciding it is associated with an underlying layer 13 of a carbon fiber-SiC matrix composite with a thickness of 20 to 200 μm. In other words, the outer layer 10 extends beyond the first row of fibers of the matrix 4 (or the second row) shown in mixed line form.

This continuity of the composite material, where there is a progressive passage from the carbon-carbon composite to the carbon-silicon carbide composite, ensures a good adhesion of the outer SiC layer 10.

The cracks 12 in the outer SiC layer 10 are sealed by a 2 to 10 μm thick SiC coating 14. This SiC sealing coating 14 is completed by a nitride coating 16 and in particular a coating of aluminum nitride, boron nitride or hafnium nitride with a thickness of 200 to 3000 nm, as a function of the material used.

The composite material according to the invention is coated with a final alpha alumina layer 18 with a thickness of 2 to 100 μm.

Examples will now be given of the production of the composite material according to the invention shown in FIG. 1.

Example 1

This production example will be described with reference to FIG. 2.

The first stage of the process, as represented by block 20, consists of forming a deformable porous carbon structure by weaving carbon fibers wicks in three orthogonal dimensions in per se known manner. These fibers wicks are formed from approximately 3000 PAN filaments with a high modulus of type M40-Toray.

The second stage of the process, as represented by block 22, consists of depositing a 80 nm thick pyrolytic carbon, anisotropic coating on each fibers. This pyrolytic carbon is formed by chemical vapor phase deposition in an isothermal furnace heated to 1100° C., in which methane circulates under a pressure of 1.5 KPa for one hour.

The following stage of the process, represented by block 24, consists of depositing an approximately 150 nm thick SiC coating by CVD using a mixture of trichloromethyl silane and hydrogen raised to 900° C. in a ratio of $[H_2]:[CH_3SiCl_3]$ of 8 at a pressure of 10 mPa for 10 hours.

The thus obtained substrate is then shaped, as indicated at 25, followed by densification with a view to forming a SiC-doped carbon matrix, as indicated by block 26 in FIG. 2. To this end, the substrate undergoes vacuum impregnation by a phenolic resin of the resol type and onto which have been chemically grafted 10% silicone functions. This impregnation takes place in vacuo (pressure below 1 KPa).

The impregnated structure is then polymerized at atmospheric pressure to a temperature of 200° C. and then the crust is removed, so as to take away excess resin. This is followed by a pyrolysis of the resin in a neutral medium at about 800° C., in order to convert the cross-linked polymer into hard coke (vitreous carbon). A subsequent heat treatment at between 1200° and 1800° C. makes it possible to convert the Si-O bonds of the polymer into SiC.

This treatment phase involving the impregnation, polymerization, pyrolysis and subsequent thermal treatment is carried out five times in succession. The composite material then reaches a density of 1.45 to 1.5.

After machining, the parts to be silicided (shaped substrates) are immersed in a mixture of powders containing by weight 10% $Al_2O_3$, 30% Si and 60% SiC. These powders have a grain size distribution of 30 to 60 μm and an apparent density, after compression, of 1. Siliciding is carried out in a graphite crucible.

The crucible with its charge then undergoes a heat treatment at 1700° C., under an argon atmosphere for 1 hour. In this way a 300 to 500 μm thick SiC surface layer 10 is formed. This siliciding stage is represented by block 28 in FIG. 2.

The parts, following the removal of their powder matrix, are cleaned and checked (weighing, measuring the thickness of the outer SiC layer by eddy current) before receiving the chemical vapor phase deposit of SiC 14.

For this purpose, the parts are placed in the aforementioned isothermal furnace kept at 950° C., in which there is a circulation under 1 KPa of a mixture of trichloromethyl silane and hydrogen in a ratio $[H_2]:[CH_3SiCL_3]$ of 8 for twice 2 hours. The parts are turned over after the first 2 hours, in order to carry out an approximately 5 μm SiC deposit 16 on all the visible surfaces of the parts. This stage is represented by block 30 in FIG. 2.

Following this cycle, the parts undergo chemical vapor phase deposition of an aluminum nitride coating 16. This stage is shown by block 32 in FIG. 2.

This deposition takes place at 950° C., in the same isothermal furnace as hereinbefore in which circulates under 5 KPa, a mixture of aluminium chloride ($AlCl_3$), hydrogen and ammonia under argon scavenging. The partial pressures of these different gases are given in the following tabulation:

| | |
|---|---|
| $H_2$ | 3 KPa |
| $NH_3$ | 0.6 KPa |
| $AlCl_3$ | 0.1 KPa |
| Ar | 1.3 KPa |

Deposition takes place in two cycles of 2 hours. The average thickness of the aluminum nitride coating is 1.5 μm.

On said aluminum nitride barrier coating is then deposited by CVD the outer protective alumina coating 18. This stage is represented by block 34. The reaction is performed at 950° C. in the aforementioned furnace under 5 KPa using a mixture of 1% $AlCl_3$, 49.5% $H_2O$ and 49.5% of $CO_2$ by volume. An alumina deposit of approximately 5 μm is obtained in two cycles of 3 hours.

Example 2

This example differs from example 1 by the deposition of a hafnium nitride coating in place of an aluminum nitride coating. The other stages are performed as in example 1.

HfN deposition takes place by reactive spraying or sputtering under a nitrogen atmosphere. This gives a 500 nm hafnium nitride coating adhering perfectly to the silicon carbide.

Example 3

This example differs from example 1 through the nature of the porous substrate. The other operations are identical to those of example 1. This example uses a bidimensional substrate formed by draping M 40 Toray carbon fibre fabrics, which have been preimpregnated by a phenolic resin. After draping on a mold, the part is placed under a bag in which a vacuum is produced. Baking takes place in the autoclave under 1 MPa up to 150° C. Following removal from the mold and post-baking at about 200° C., the structure obtained undergoes pyrolysis and the subsequent heat treatment already described in example 1. The part obtained then undergoes densification by the 5 phases of example 1.

Example 4

This example uses a porous substrate formed by weaving, in accordance with the three orthogonal directions, of high strength Toray T 300 type fibres.

Following the deposition of the carbon coating and the SiC coating on the fibers, as described in example 1, densification of the substrate takes place by immersion in coal tar followed by pyrolysis at an isostatic pressure of 100 MPa and at 800° C. This leads to a matrix formed solely from carbon. This coke matrix is not graphitized. The final density of the composite material is then 1.8 after 6 densification cycles.

After machining, the parts are silicided in a mixture of powders containing 75% by weight SiC and 25% by weight $SiO_2$. Siliciding is performed as in example 1 at 1650° C., under a nitrogen atmosphere and for 1 hour. The other operations are the same as in example 1.

Example 5

This example differs from example 1 by the procedure of depositing an aluminum nitride barrier coating.

In this example, there is firstly a deposition of a 1 $\mu$m aluminium coating by reactive cathodic sputtering. The part is then placed in a nitriding furnace, where progressive heating takes place under a nitrogen atmosphere. Nitriding commences at about 600° C. and then the part is progressively heated to 1200° C., which is the temperature at which complete consolidation of the aluminum nitride coating takes place.

The above examples relate to the thermal protection of aircraft reentering the atmosphere at high speed. Obviously the composite material according to the invention can be used in all industrial fields, where it is wished to have a refractory or stainless material retaining good mechanical properties at above 1100° C. in a corrosive and in particular oxidizing medium. Moreover, as a function of the envisaged application, the duration of the deposits and the heat treatments, their thickness and their number could be modified. Furthermore, the order of the stages of the process can be modified. In particular, the shaping of the substrate can take place before or after the pyrolytic carbon and/or SiC deposition on the fibers.

I claim:

1. A process for producing a composite material having a carbon fiber substrate embedded in a matrix, comprising the following steps:
    (a) forming a deformable porous substrate constituted by carbon fibers,
    (b) shaping the substrate to produce a fibrous preform,
    (c) densifying the fibrous preform by impregnating spaces between fibers with a material to form a matrix having the fibers embedded therein and a substantially continuous surface on the densified preform,
    (d) covering the surface of the densified preform with a silicon carbide layer,
    (e) depositing on the silicon carbide layer of the densified preform an intermediate coating of a compound not containing silicon,
    (f) covering the intermediate coating with an oxide coating selected from the group consisting of $ThO_2$, $ZrO_2$, $HfO_2$, $La_2O_3$, $Y_2O_3$ and $Al_2O_3$, said intermediate coating being made of a material serving as a reaction barrier between the silicon carbide and the oxide coating.

2. A process for producing a composite material incorporating a carbon fiber substrate embedded in a matrix, comprising the following steps:
    (a) forming a deformable porous substrate constituted by carbon fibers,
    (b) shaping the substrate to produce a fibrous preform,
    (c) densifying the fibrous preform by impregnating spaces between fibers with a material to form a matrix having the fibers embedded therein and a substantially continuous surface on the densified preform,
    (d) covering the surface of the densified preform with a silicon carbide layer,
    (e) depositing on the silicon carbide layer of the densified pattern preform an intermediate coating selected from the group consisting of HfC, TaC, ZrC, $W_2C$, NbC, $ThC_2$, $ZrB_2$, $HfB_2$, $TiB_2$, BN, HfN, ZrN, AlN, Pt, Ir, Os, Rh, and Ru,
    (f) covering the intermediate coating with an oxide coating not containing silicon, said intermediate coating serving as a reaction barrier between the silicon carbide and the oxide coating.

3. A process for producing a composite material incorporating a carbon fiber substrate embedded in a matrix comprising the following steps:
    (a) forming a deformable porous substrate constituted by carbon fibers,
    (b) shaping the substrate to produce a fibrous preform,
    (c) densifying the fibrous preform by impregnating spaces between fibers with a material to form a matrix having the fibers embedded therein and a substantially continuous surface on the densified preform,
    (d) covering the surface of the densified preform with a silicon carbide layer,
    (e) depositing on the silicon carbide layer of the densified preform an intermediate coating selected from the group consisting of HfC, TaC, ZrC, $W_2C$, NbC, $ThC_2$, $ZrB_2$, $HfB_2$, $TiB_2$, BN, HfN, ZrN, AlN, Pt, Ir, Os, Rh and Ru,
    (f) covering the intermediate coating with an oxide coating selected from the group consisting of $ThO_2$, $ZrO_2$, $HfO_2$, $La_2O_3$, $Y_2O_3$ and $Al_2O_3$, said intermediate coating serving as a reaction barrier between the silicon carbide and the oxide coating.

4. The process according to claims 1, 2, or 3, wherein the substrate is densified by impregnating with a carbon-based material.

5. The process according to claims 1, 2, or 3, wherein the silicon carbide layer is obtained by siliciding the outer surface of the densified preform.

6. The process according to claims 1, 2, or 3, wherein the intermediate coating is made with a material selected from the group consisting of aluminum nitride, boron nitride and hafnium nitride.

7. The process according to claims 1 or 2, wherein the oxide is $Al_2O_3$.

8. The process according to claims 1, 2, or 3, wherein step (d) includes the formation of at least one crack in the layer of silicon carbide, said crack subsequently being sealed with a sealing layer of silicon carbide.

9. The process according to claim 8, wherein the sealing layer of silicon carbide is obtained by plasma-assisted chemical vapor deposition of a mixture containing at least one organosilane substituted with from zero to four halogen atoms and at least one compound selected from the group consisting of hydrogen and a hydrocarbon.

10. The process according to claim 8, wherein the sealing layer of silicon carbide is obtained by chemical vapor phase deposition of a mixture containing at least one organosilane substituted with from zero to four halogen atoms and at least one compound selected from the group consisting of hydrogen and a hydrocarbon.

11. The process according to claims 1, 2, or 3, wherein a silicon carbide film is deposited on each fiber of said fibrous preform before densifying said fibrous preform.

12. The process according to claims 1, 2, or 3, wherein a pyrolytic carbon film is deposited on each fiber of said fibrous preform before densifying said fibrous preform.

13. The process according to claims 1, 2, or 3, wherein the fibrous preform is densified by impregnating with a carbon-based material containing finely divided silicon carbide.

14. The process according to claim 13, wherein the carbon-based material comprises functional groups with Si-O bonds.

15. The process according to claims 1, 2, or 3, wherein the $Al_2O_3$ coating is alpha-alumina.

* * * * *